United States Patent [19]

Nozaki et al.

[11] Patent Number: 5,473,543
[45] Date of Patent: Dec. 5, 1995

[54] SHIFT TIMING DETECTING SYSTEM FOR AUTOMATIC TRANSMISSION

[75] Inventors: Kazutoshi Nozaki; Kunihiro Iwatsuki, both of Toyota; Hidehiro Oba, Aichi; Yoshinobu Nozaki, Anjo; Tetsuo Hamajima, Toyota, all of Japan

[73] Assignee: Toyota Jidosha Kabushiki Kaisha, Toyota, Japan

[21] Appl. No.: 288,791

[22] Filed: Aug. 12, 1994

[30]   Foreign Application Priority Data

Aug. 12, 1993  [JP]  Japan .................. 5-220599

[51] Int. Cl.$^6$ ............................................. B60K 41/06
[52] U.S. Cl. .................. 364/424.1; 364/431.05; 477/132; 477/148
[58] Field of Search ............... 364/424.1, 431.05; 74/866, 844, 845

[56]             References Cited

U.S. PATENT DOCUMENTS

| | | | |
|---|---|---|---|
| 5,150,296 | 9/1992 | Iwatsuki et al. | 364/424.1 |
| 5,150,297 | 9/1992 | Daubenmier et al. | 364/424.1 |
| 5,182,710 | 1/1993 | Tomisawa | 364/424.1 |
| 5,233,523 | 8/1993 | Follmer | 364/424.1 |
| 5,251,512 | 10/1993 | Koenig et al. | 74/862 |
| 5,265,498 | 11/1993 | Fodale et al. | 74/858 |

*Primary Examiner*—Kevin J. Teska
*Assistant Examiner*—Susan Wieland
*Attorney, Agent, or Firm*—Oblon, Spivak, McClelland, Maier & Neustadt

[57]               ABSTRACT

A shift timing detecting system for detecting the start of a shift of an automatic transmission A in terms of a change in the R.P.M. of a predetermined rotary member after a shift command has been outputted. The shift timing detecting system comprises: a detector for detecting a change in the output R.P.M. of the automatic transmission; an arithmetic processor for arithmetically processing the change in the output R.P.M. with different coefficients to determine two processed values: a comparator for comparing the two processed values: and a shift start decider 5 for deciding the start of the shift on the basis of the result of the comparison. Since the shifting situation can be grasped from the change in the output torque accompanying the start of the shift and the change in the output R.P.M. caused by the former change, the start of the shift can be accurately detected without any time delay.

7 Claims, 4 Drawing Sheets

SHIFT TIMING DETECTING SYSTEM FOR AUTOMATIC TRANSMISSION

BACKGROUND OF THE INVENTION

The present invention relates to a system for detecting the start timing of a shift after a shift command has been outputted in an automatic transmission for a vehicle.

As is well known in the art, the automatic transmission of a vehicle has its shift accompanied by a change in the rotation of an engine or other rotary elements. Thus, the inertial torque is absorbed by frictional engagement means to damp the shifting shock. In order to reduce the heat to be absorbed by the frictional engagement means thereby to damp the shifting shock and improve the durability of the frictional engagement means, moreover, the control to be executed in the prior art is to lower the engine torque during the shifting operation.

Since the control for the shift such as the control of lowering the engine torque during the shifting operation is started after the start of a shift in the automatic transmission, it has to be premised by an accurate detection of the start of the shift.

The shifting operation of the automatic transmission is accompanied by a fluctuation of the output torque and a change in the revolution speed (i.e., R.P.M.). Generally in the prior art, therefore, the start of a shift is decided if the difference between the product of the output R.P.M. and the gear ratio and the input R.P.M. exceeds a predetermined reference value. However, these changes in the R.P.M. are caused when an inertia phase is entered. In the aforementioned deciding method, therefore, the start of the shift is decided from the instant when a delay occurs from the actual start of the shift. Thus, there arises a disadvantage that the shift cannot be controlled highly accurately.

Since a torsional vibration of a power transmission line due to a torque fluctuation occurs in a torque phase preceding the inertia phase, there is proposed in the prior art a system for deciding the start of a shift by noting the occurrence of the torsional vibration, as in Japanese Patent Laid-Open No. 54/1992. In this system, the R.P.M. of a predetermined rotary element is predicted on the basis of the hysteresis of the change in the rotation so that the start of a shift is decided from the deviation between the predicted value and the actual R.P.M.

The aforementioned system, as disclosed in Japanese Patent Laid-Open No. 54/1992, detects the start of a shift in terms of the rotational fluctuation in the torque phase preceding the inertia phase so that it can eliminate the delay of the detection of the shift timing to some extent. Since, however, the aforementioned predicted R.P.M. of the rotary element providing a reference for deciding the start of the shift contains causes for disturbances such as the vibration of the vehicle or the torque fluctuation, the decision of the start of the shift has its accuracy deteriorated if it is based upon the prediction. If the detection of the hysteresis of the change in the R.P.M. of the rotary element is elongated to eliminate such disadvantage, a delay is caused in the decision of the start of the shift. Thus in the aforementioned system of the prior art, the control of lowering the engine torque may be delayed.

SUMMARY OF THE INVENTION

An object of the present invention is to provide a shift timing detecting system capable of detecting the start of a shift accurately without delay and a detecting method for the system.

The present invention contemplates to provide novel system and method for detecting the start of a shift by making an effective use of the torsional vibration of a power transmission line in a torque phase. Specifically, according to the present invention, there is provided a shift timing detecting system for detecting the start of a shift of an automatic transmission A in terms of a change in the R.P.M. of a predetermined rotary member 1 after a shift command has been outputted, as shown in a conception diagram of FIG. 1. The shift timing detecting system comprises: a detector 2 for detecting a change in the output R.P.M. of the automatic transmission; an arithmetic processor 3 for arithmetically processing the change in the output R.P.M. with different coefficients to determine two processed values; a comparator 4 for comparing the two processed values; and a shift start decider 5 for deciding the start of the shift on the basis of the result of the comparison.

Specifically, when a shift command is outputted, the output R.P.M. is changed by the fluctuation of the output torque and the torsional vibration based on the fluctuation, so that it is detected by the detector 2. The detected value of the change in the output R.P.M. is arithmetically processed with two different coefficients by the arithmetic processor 3 so that two processed values are determined. These arithmetic processings are smoothing operations for leveling the change for a predetermined time period, and these processed values are compared by the comparator 4. Since these processed values are obtained by processing the aforementioned change arithmetically with different coefficients, the processed values have the larger difference for the larger change in the output R.P.M. As a result, the start of a shift is decided by the shift start decider 5, when the processed values are compared by subtracting or dividing them by the comparator 4 so that the compared result takes a predetermined value. In the system of the present invention, therefore, the start of a shift is decided by reflecting the rotational fluctuation of the output R.P.M. for a minute time period so that the start of the shift in the torque phase can be decided accurately without delay.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENT

Figure 1:
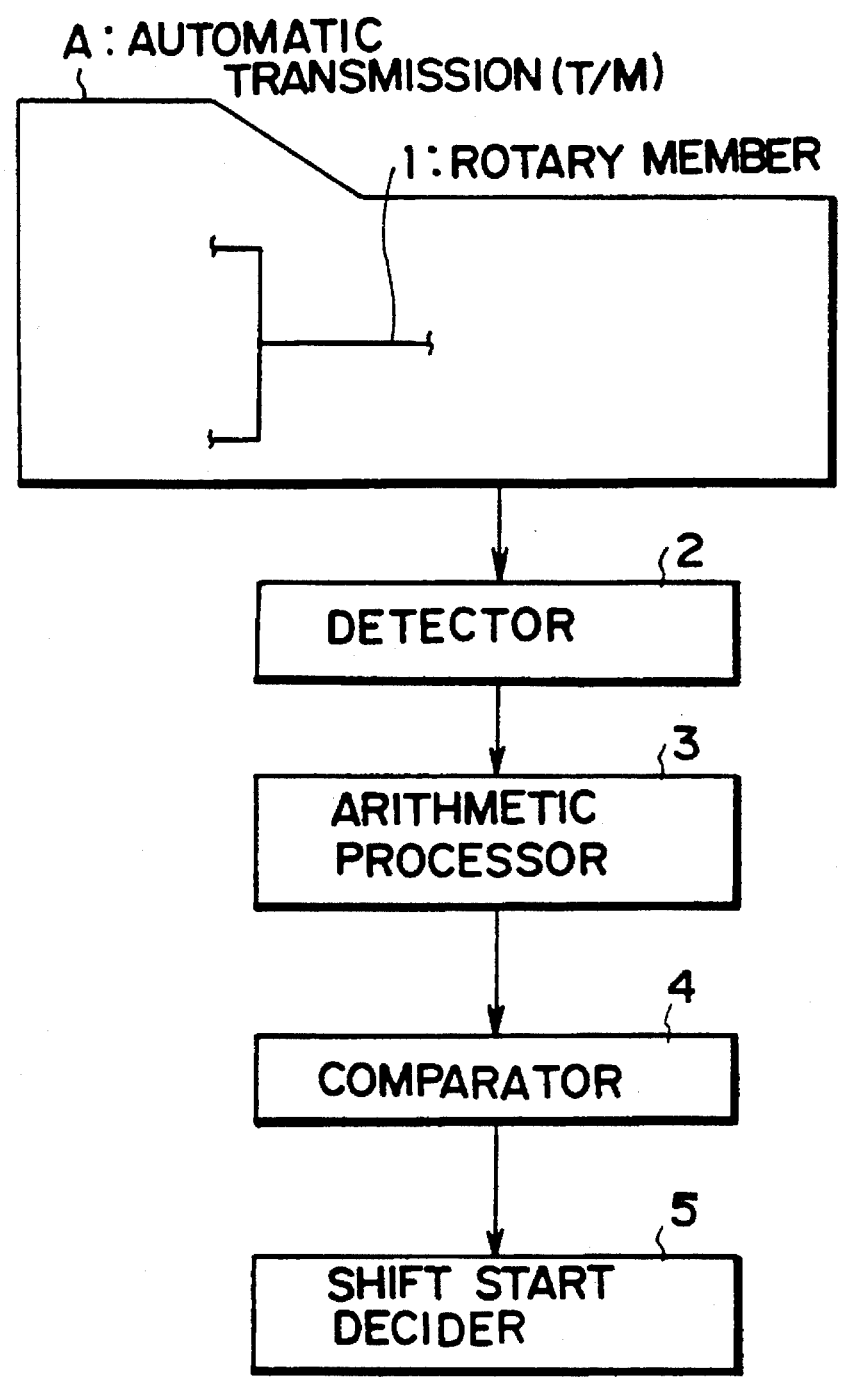
FIG. 1 is a conception diagram illustrating the subject matter of the present invention in a functional form.
Figure 2:
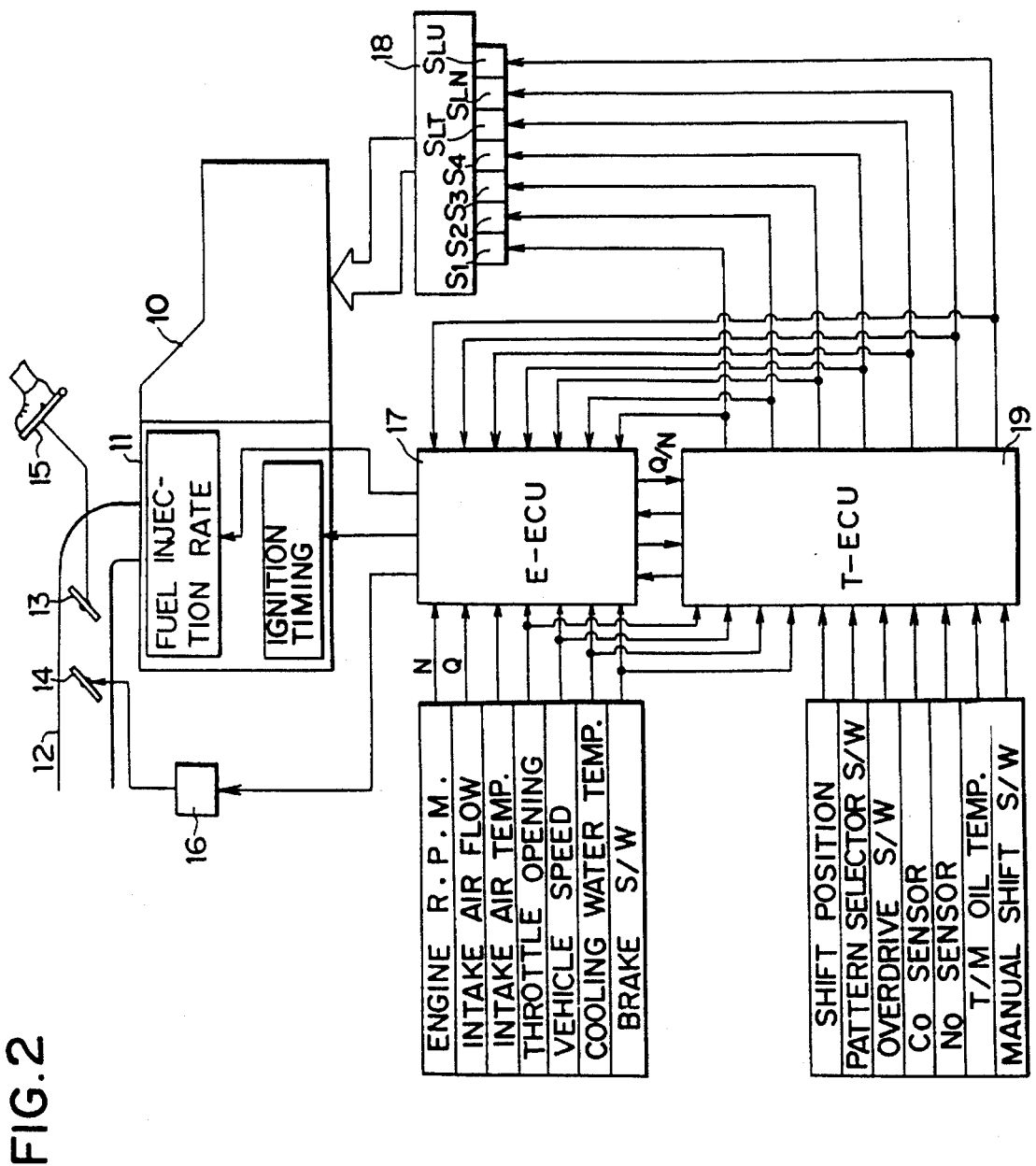
FIG. 2 is a control system diagram showing one embodiment of the present invention.

As shown in FIG. 2, an engine E connected to the automatic transmission A is equipped in its intake pipe 12 with a main throttle valve 13 and a sub-throttle valve 14 located upstream of the former. The main throttle valve 13 is so connected to an accelerator pedal 15 that it is controlled according to the depression of the accelerator pedal 15. On the other hand, the sub-throttle valve 14 is controlled by a motor 16. There is provided an engine electronic control unit (E-ECU) 17 for controlling the motor 16 to regulate the opening that sub-throttle valve 14 and for controlling the fuel injection rate and the ignition timing of the engine E. This electronic control unit 17 is composed mainly of a central processing unit (CPU), memory units (RAM and ROM) and an input/output interface and is fed as control data with a variety of signals including an engine (E/G) R.P.M. N, an amount Q of intake air, a temperature of intake air, a throttle opening, a vehicle speed, a temperature of engine water and a brake switch.

The automatic transmission A is equipped with a gear train, as disclosed in the aforementioned Japanese Patent Laid-Open No. 54/1992, for example. A hydraulic control unit 18 controls the shift, a lockup clutch, a line pressure and/or an applying pressure of a predetermined frictional engagement means. The hydraulic control unit 18 is electrically controlled and equipped with: first to third shift solenoid valves $S_1$ to $S_3$ for executing the shift; a fourth solenoid valve $S_4$ for controlling an engine braking state; a linear solenoid valve $S_{LT}$ for controlling the line pressure; a linear solenoid valve $S_{LN}$ for controlling an accumulator back pressure; and a linear solenoid valve $S_{LU}$ for controlling the applying pressure of the lockup clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as the control data with the throttle opening, the vehicle speed, the cooling water temperature, the brake switch signal, a shift position signal, a pattern select switch signal, an overdrive switch signal, a signal coming from a Co sensor for detecting the R.P.M. of a clutch Co, as corresponds to the input R.P.M., a signal coming from a No sensor for detecting the output R.P.M., an oil temperature of the automatic transmission and a signal of a manual shift switch.

Moreover, the automatic transmission electronic control unit 19 and the engine electronic control unit 17 are connected with each other for data communications. Specifically, signals such as a signal of an amount (Q/N) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides tile gear stage, the ON/OFF of the lockup clutch, or the regulated pressure level of the line pressure or the applying pressure on the basis of the data inputted and the map stored in advance and outputs a command signal to a predetermined solenoid valve on the basis of the decision result to decide a failure or perform a control based on the decision. On the other hand, the engine electronic control unit 17 not only controls the fuel injection rate, the ignition timing and/or the opening of the sub-throttle valve 14 on the basis of the data inputted but also lowers the output torque temporarily by reducing the fuel injection rate at the shifting time of the automatic transmission A, by changing the ignition timing and/or by throttling the opening of the sub-throttle valve 14.

Figure 3:
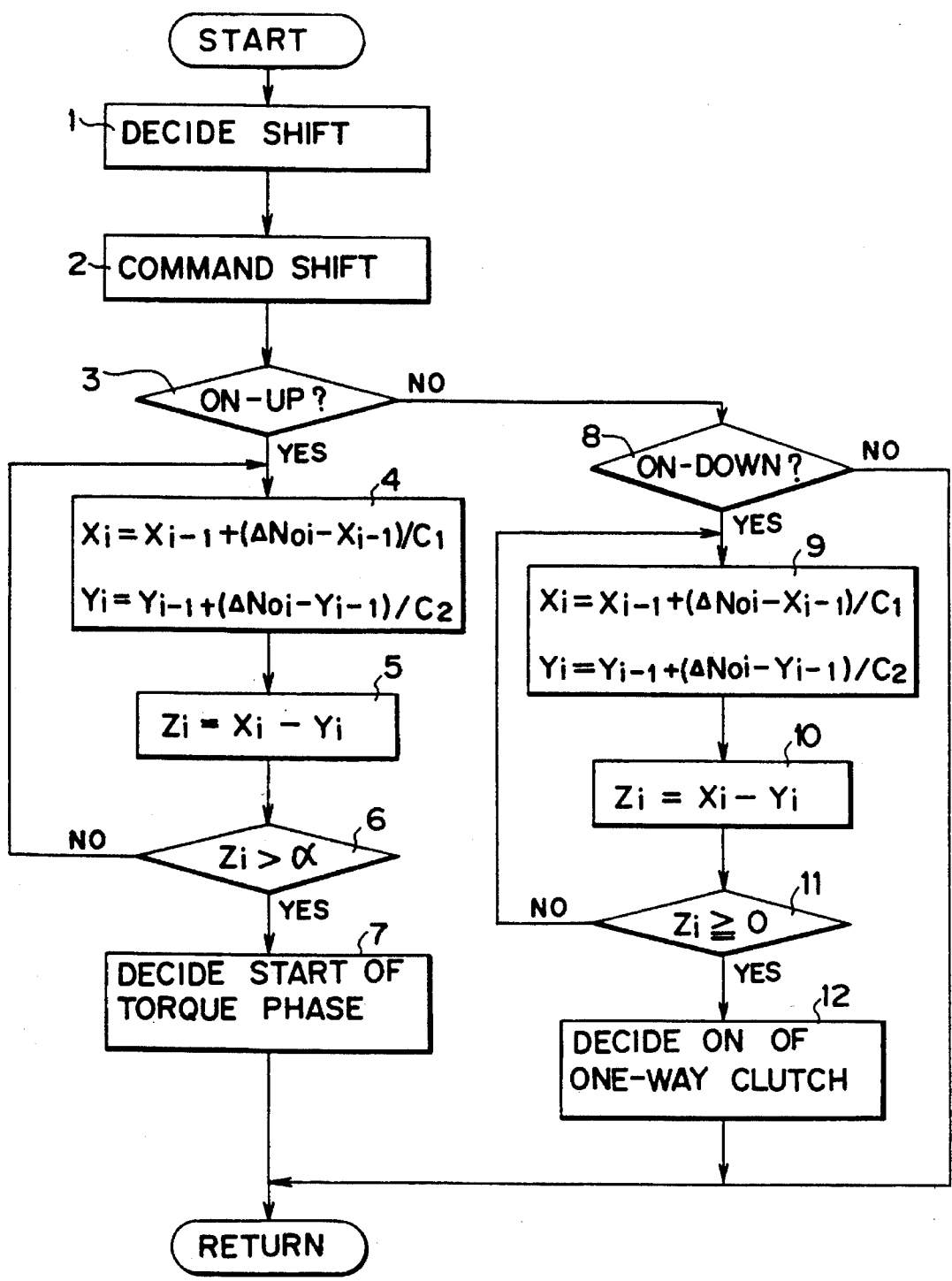
FIG. 3 is a flow chart showing a routine for deciding the start of a shift by the system of the present invention.

The control for lowering the engine torque is started with a shift, the decision of which is executed in the following manner. FIG. 3 is a flow chart showing a control routine of deciding the start of a shift. If a shift is decided (at Step 1) on the basis of the throttle opening, the vehicle speed and the shift diagram (or map), a shift command is outputted (at Step 2) to execute the shift. It is then decided (at Step 3) whether or not the shift is a power-ON upshift (i.e., an upshift to be caused by depressing the accelerator pedal). If the answer is "YES", the routine advances to Step 4, at which the change in the output R.P.M. is calculated.

As a specific example, a change $\Delta No$ in the output R.P.M. for a time period of 128 msecs. is determined at a sampling interval of 16 msecs. The changes obtained are smoothed with different smoothing coefficients $C_1$ and $C_2$ according to the following formula:

$$X_i = X_{i-1} + (\Delta No_i - X_{i-1})/C_1 \text{(e.g., ``16'')};$$

and $$Y_i = Y_{i-1} + (\Delta No_i - Y_{i-1})/C_1 \text{(e.g., ``4'')},$$

wherein:

$X_i$ and $Y_i$: Values obtained by a smoothing process of instant i;

$X_{i-1}$ and $Y_{i-1}$: Values obtained by the previous smoothing process; and $\Delta No_i$: Change in the output R.P.M. at the instant i, as calculated at all times by another routine.

The values $X_i$ and $Y_i$ thus obtained are equal without any change in the output R.P.M. but become different with a change because the smoothing coefficients $C_1$ and $C_2$ are different. At Step 5, therefore, the difference $Z_i$ between those values $X_i$ and $Y_i$ is calculated. It is then decided (at Step 6) whether or not the difference $Z_i$ is larger than a predetermined reference value $\alpha$. If the difference $Z_i$ is no more than the reference value $\alpha$, the routine returns to Step 4. If the reference value $\alpha$ is exceeded, the start of a torque phase is decided (at Step 7). Here, the reference value $\alpha$ is either a constant or a variable varying with a parameter indicating the running state. Hence, if the reference value $\alpha$ is exceeded by the aforementioned difference $Z_i$, it can be decided that the shift has been started because the output R.P.M. changed due to the torsional vibration caused by the fluctuation of the output torque at the shifting time.

Figure 4:
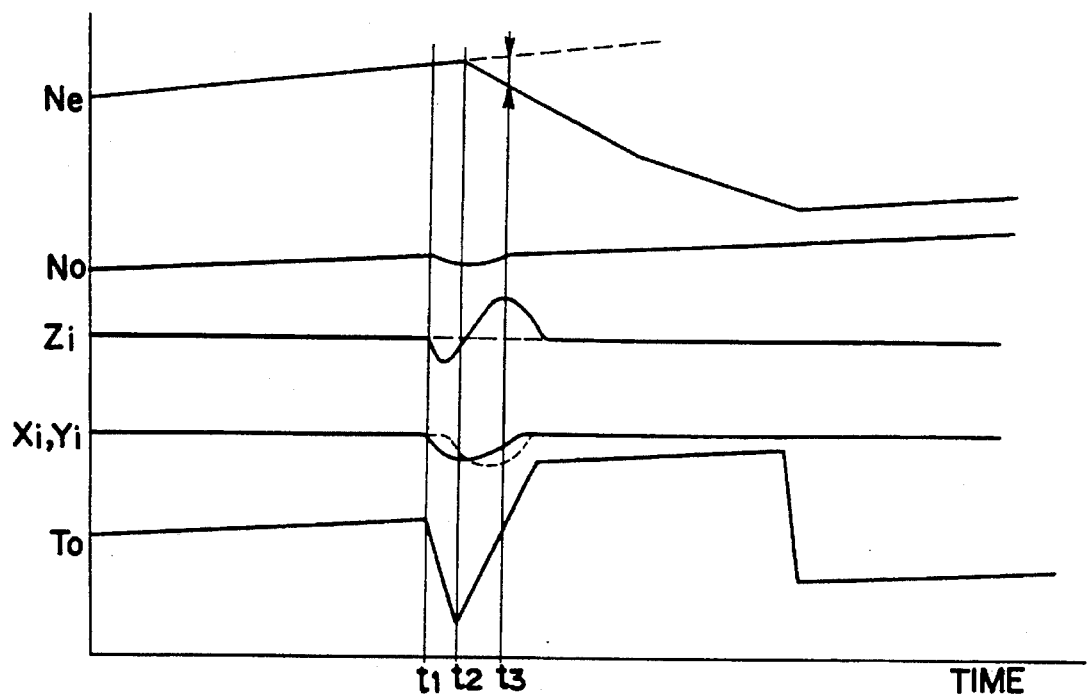
FIG. 4 is a time chart showing the changes in individual values for a power-ON upshift with time.

The timing for the decision of the start of a shift thus made is illustrated in the time chart of FIG. 4. In FIG. 4: letters Ne designate the engine R.P.M.; letters No designate the output R.P.M.; and letters To designate the output torque. When a shift command for an upshift is outputted as the vehicle speed rises with an increase in the throttle opening, the output torque begins to drop (at instant $t_1$) with a change in the torque capacity of the frictional engagement means participating in the shift. As a result, the predetermined frictional engagement means begin to engage whereas the remaining ones begin to slip so that the output torque begins to rise (at instant $t_2$). The torque phase is established for the time period from instant $t_1$ to instant $t_2$ whereas the inertia phase is established at and after instant $t_2$. In this inertia phase, the engine R.P.M. Ne begins to drop.

When the torque phase starts, the power transmission line is caused to establish a torsional vibration by its own elasticity so that the output R.P.M. changes. As a result, the aforementioned individual values $X_i$ and $Y_i$, which are calculated by smoothing the minute changes in the output R.P.M., have the difference $Z_i$, which has its plus or minus sign inverted as the time elapses. If the reference value α for deciding the difference $Z_i$ is given a minute absolute value, the torque phase can be actually detected simultaneously as it starts. Incidentally, the system of the prior art in which a shift is started on the basis of the engine R.P.M., decides the start of the shift at instant $t_3$ after the start of an inertia phase so that its decision is seriously delayed.

Incidentally, if the answer of Step 3 of FIG. 3 is "NO", the routine advances to Step 8, at which it is decided whether or not the shift is a power-ON downshift (i.e., a downshift to be caused by depressing the accelerator pedal). If this answer is "NO", the routine is returned. If the answer is "YES", on the other hand, the routine advances to Step 9, at which an operation similar to that of the foregoing Step 4 is executed. At Step 10, the difference $Z_i$ between those values $X_i$ and $Y_i$ is calculated as at Step 5. At Step 11, it is decided whether or not the difference $Z_i$ is no less than zero (i.e., $\geq 0$). The routine then returns to Step 9, if the answer is "NO". If the answer is "YES", on the other hand, the routine advances to Step 12, at which it is decided that the one-way clutch has been applied to start the shift.

Figure 5:
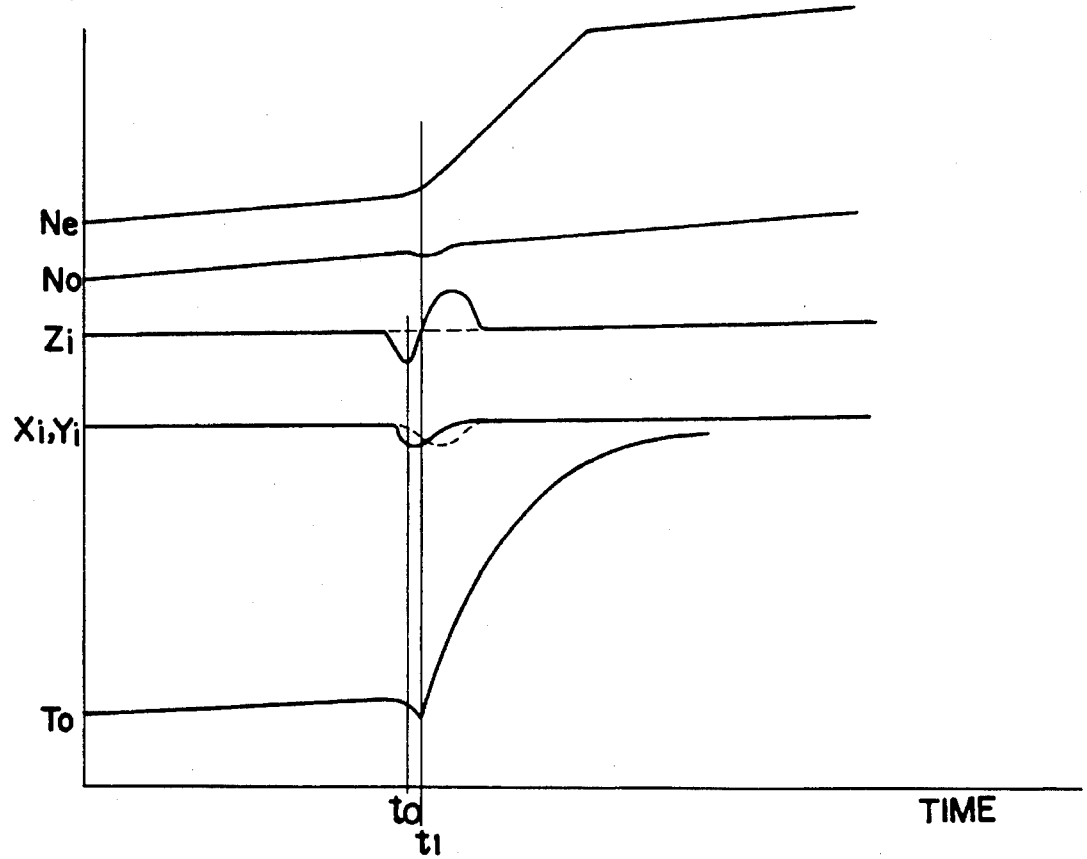
FIG. 5 is a time chart showing the changes in individual values for a power-ON downshift with time.

When the output R.P.M. changes according to the release or engagement of predetermined frictional engagement means after a shift command has been outputted, as shown in the time chart of the power-ON downshift of FIG. 5, the difference $Z_i$ between the values $X_i$ and $Y_i$, which are processed from the minute change with the different smoothing coefficients, changes to have its plus or minus sign inverted. At instant $t_1$ when the difference $Z_i$ changes from the minus to plus signs, the output torque is begun to rise by the engagement of the one-way clutch so that the smoothed values $X_i$ and $Y_i$ take the same value. If, therefore, the shift is decided to start at that instant, this shift start can be decided without any substantial delay from the actual one.

Incidentally, the value $X_i$ or $Z_i$ at the time of the power-ON downshift takes its minimal value prior to the engagement of the one-way clutch, as shown in FIG. 5. In other words, the gradient changes at instant $t_o$. Since this instant $t_o$ falls after the shift command and before the engagement of the one-way clutch, it may be decided as the shift start. Then, the start of a shift can be detected at an earlier instant.

Moreover, the present invention should not be limited to the embodiment described above, but the arithmetic processing of the minute change in the output R.P.M. may be either a smoothing operation using smoothing coefficients other than those exemplified in the foregoing embodiment or another arithmetic processing.

Here will be generally described the effect to be attained from the present invention. The shift timing detecting system of the present invention decides the start of a shift by processing the minute changes in the output R.P.M., which are caused by the fluctuation of the output torque after the shift has been commanded, with different coefficients and by comparing the two values obtained from the processing. As a result, the start of an actual shift such as the start of a torque phase at the time of a power-ON upshift or the start of a shift accompanying the engagement of a one-way clutch at the time of a power-ON downshift can be detected remarkably accurately without any time delay. According to the system of the present invention, therefore, the control of lowering the engine torque at a shifting time can be executed at an excellent timing to reduce the shifting shock and improve the durability of the frictional engagement means more effectively.

What is claimed is:

1. A shift timing detecting system for detecting the start of a shift of an automatic transmission in terms of a change in the revolution speed of a predetermined rotary member after a shift command has been outputted, comprising:

detection means for detecting a change in an output revolution speed of said automatic transmission;

arithmetic processing means for arithmetically processing the change in said output revolution speed with at least two different coefficients to determine two processed values dependent on said coefficients;

comparison means for comparing said two processed values; and shift start deciding means for deciding the start of the shift of the automatic transmission when the result of the comparison exceeds a predetermined reference value.

2. A shift timing detecting system according to claim 1, wherein said arithmetic processing means includes:
   means for determining the changes in said output revolution speed at a predetermined time interval; and
   means for determining two values by averaging and integrating the change in the output revolution speed for a predetermined time period with two different coefficients, and wherein said comparison means includes means for determining a difference between said two values.

3. A shift timing detecting system according to claim 2, wherein said shift start deciding means includes means for deciding the start of the shift from the fact that said difference is larger than a predetermined reference value, in case said shift command belongs to a power-ON upshift.

4. A shift timing detecting system according to claim 2, wherein said shift start deciding means includes means for deciding the start of the shift from the fact that said difference takes a value other than zero, in case said shift command belongs to a power-ON downshift.

5. A shift timing detecting system according to claim 2, wherein said shift start deciding means includes means for deciding an instant when the value averaged and integrated with the larger one of said two coefficients takes a minimal value, as the starting instant of the shift, in case said shift command belongs to a power-ON downshift.

6. A shift timing detecting system according to claim 1, wherein said arithmetic processing means includes means for determining two processed values $X_i$ and $Y_i$ by the following arithmetic operation:

$$X_i = X_{i-1} + (\Delta No_i - X_{i-1})/C_1;$$

and $$Y_i = Y_{i-1} + (\Delta No_i - Y_{i-1})/C_1,$$

wherein:

$\Delta No_i$: such one of the changes in the output R.P.M. determined at a predetermined time interval as falls at instant i; and $C_1$ and $C_2$: coefficients for averaging the change in the output R.P.M.

7. A shift timing detecting method for detecting the start of a shift of an automatic transmission in terms of a change in the revolution speed of a predetermined rotary member after a shift command has been outputted, comprising the steps of:

detecting a change in an output revolution speed of said automatic transmission;

using arithmetic processing means for arithmetically processing the change in said output revolution speed with at least two different coefficients to determine two processed values dependent on said coefficients;

using comparison means for comparing said two processed values; and deciding the start of the shift of the automatic transmission when the result of the comparison exceeds a predetermined reference value.

* * * * *